United States Patent [19]

Sigouin

[11] 4,276,918
[45] Jul. 7, 1981

[54] TREE PROCESSING UNIT

[76] Inventor: Roger Sigouin, 601, R. 111 West, Amos, Quebec, Canada, J9T 2Y1

[21] Appl. No.: 967,050

[22] Filed: Dec. 6, 1978

[30] Foreign Application Priority Data

Jun. 22, 1978 [CA] Canada ................................. 306062

[51] Int. Cl.³ ............................................ A01G 23/08
[52] U.S. Cl. .................................. 144/2 Z; 144/3 D; 212/266; 414/686; 414/718
[58] Field of Search ................... 144/2 Z, 3 D, 34 R, 144/34 E, 309 AC; 212/144; 414/686, 718

[56] References Cited

U.S. PATENT DOCUMENTS

| 3,426,926 | 2/1969 | Witwer | 414/718 |
| 3,549,032 | 12/1970 | Krause, Jr. | 414/718 |
| 3,620,272 | 11/1971 | Eriksson | 144/2 Z |
| 3,635,266 | 1/1972 | Eriksson | 144/2 Z |
| 3,838,721 | 10/1974 | Golob et al. | 144/3 D |
| 3,913,756 | 10/1975 | Barron et al. | 414/718 |

FOREIGN PATENT DOCUMENTS

| 779081 | 2/1968 | Canada | 144/2 Z |
| 2606179 | 8/1976 | Fed. Rep. of Germany | 144/2 Z |

Primary Examiner—W. Donald Bray
Attorney, Agent, or Firm—Schwartz, Jeffery, Schwaab, Mack, Blumenthal & Koch

[57] ABSTRACT

A tree processing unit having a base and a boom with a front end and a back end, extending through the base. Means are provided for moving the boom through the base the base has means for gripping a tree at its butt end. Means are fixed on the front end of the boom for gripping and debranching the tree, and for cutting the top of the tree. The unit is adapted to be mounted on known motorized equipment so the unit can be carried and manoeuvred and provided with power.

22 Claims, 11 Drawing Figures

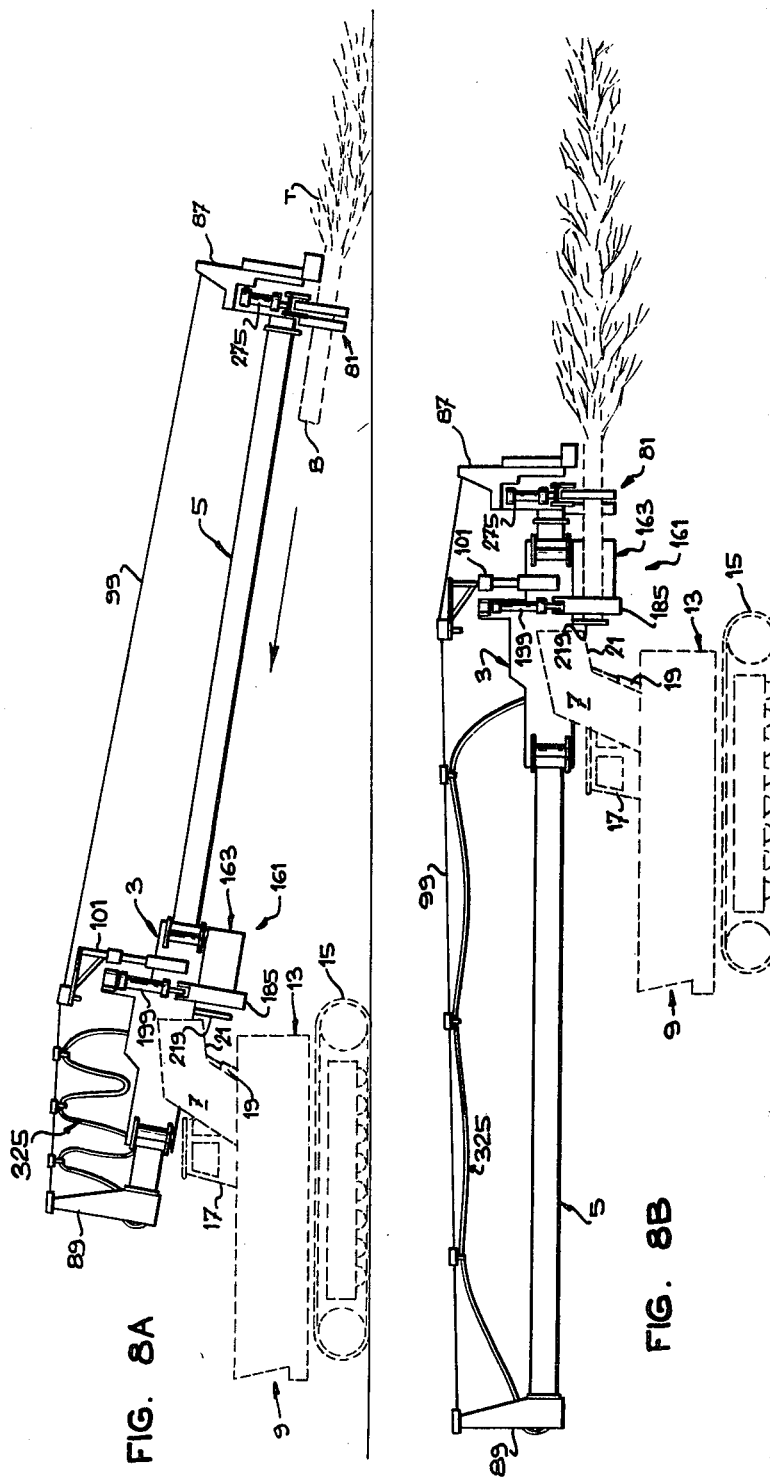

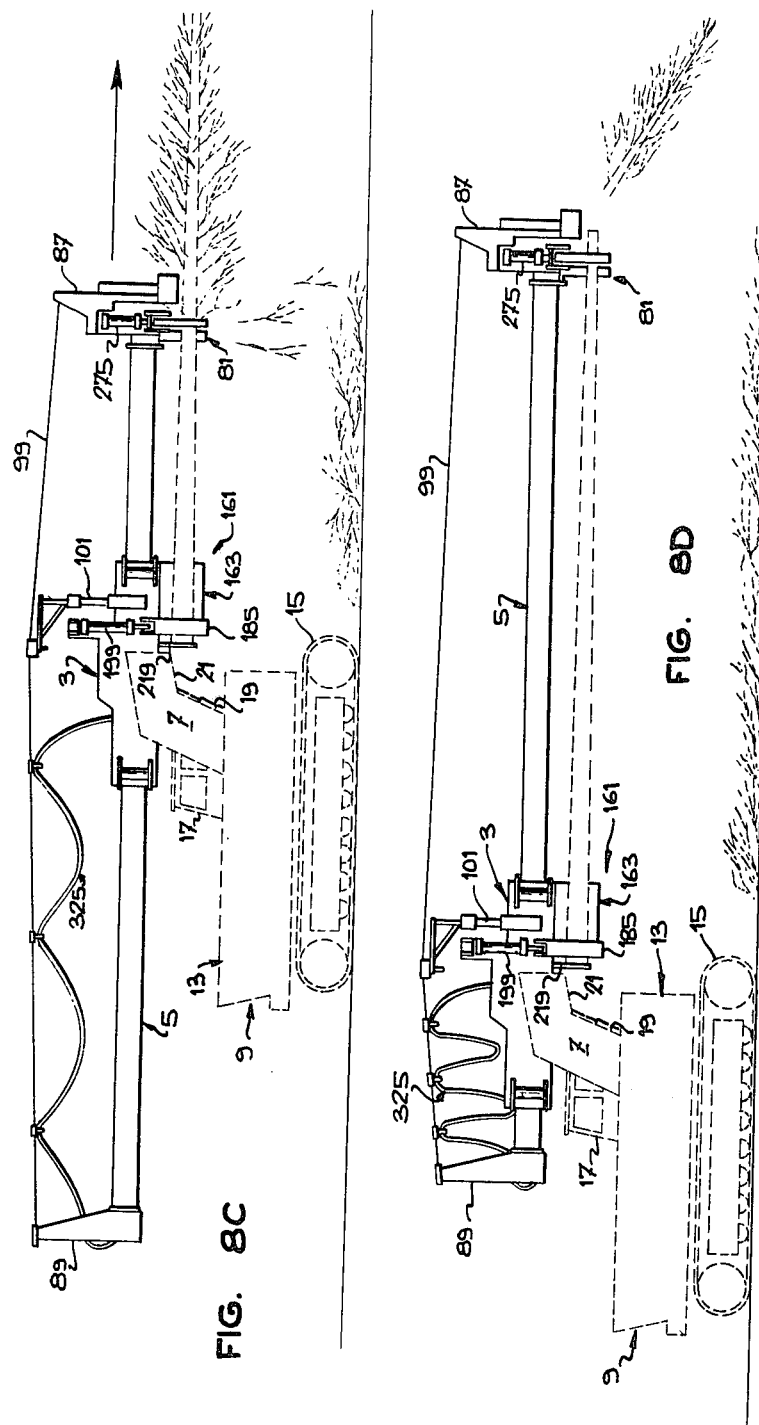

TREE PROCESSING UNIT

The present invention relates to an improved tree processing unit.

The invention more particularly relates to an improved tree processing unit of the type which handles, debranches, and cuts the top of a tree.

The improved tree processing unit according to the present invention is particularly adapted to be detachably mounted on existing motorized equipment to expand the capabilities of such equipment.

Tree processing equipment for handling, debranching and cutting the tops of trees are well known. Examples of such equipment are shown in the following U.S. Pat. Nos. 3,482,611; 3,590,760; 3,616,825; 3,635,266; 3,796,241 and 3,894,568. The trunk or bole debranching and handling arrangements on this known processing equipment are often quite complicated and difficult to maintain. All the known equipment includes motorized means as an integral part of the equipment so that the equipment can travel and manoeuver, and can also carry the power supply to operate the handling, debranching and cutting means. The known equipment is thus very expensive.

The known euipment has other faults as well. The systems supplying power to the handling, debranching, and cutting means are often not well located and/or protected and consequently they are often easily damaged, this resulting in costly machine downtime. The known equipment generally also employs telescoping booms to handle large trees thus adding to the expense and maintenance of the equipment. If the equipment is made compact, without using telescoping booms it often cannot debranch long trees in one operation without cutting the tree up, thus adding to product handling problems. Moreover, where a travelling single unit boom is employed, such as in U.S. Pat. No. 3,616,825 the single chain drive means for the boom is not always reliable.

It is therefore an object of the present invention to provide an improved tree processing unit which is relatively simple in construction, reliable in operation, and easily maintained.

It is another object of the present invention to provide an improved processing unit which can be easily installed on existing motorized equipment, and more particularly, on known hydraulically operated excavators having their booms and shovels removed. Such a unit, when installed, provides for relatively inexpensive tree processing equipment since separate motorized and power supply means are not required.

It is a further object of the present invention to provide an improved processing unit comprising a boom which is strong and capable of handling relatively large trees, while being relatively simple and compact in construction. In accordance with the invention, a sliding boom is employed rather than a telescoping boom, which sliding boom is strengthened by tensioning cables so that a longer boom length can be employed.

It is still another object of the present invention to provide an improved processing unit with a handling arrangement for the power supply lines leading to the handling, debranching and cutting means. In accordance with the invention, the lines are slidably supported on the tensioning cables at the rear of the unit, away from the processing operation, and lead to the processing means through the boom being protected thereby. In addition the improved processing unit according to the invention employes more reliable boom drive means and guiding means. The improved processing unit also employs improved handling and bebranching equipment.

In accordance with the present invention, all of these objects are achieved with a tree processing unit which is used in combination with a conventional motor vehicle of the type which contains hydraulically operated power means, the motor vehicle including a main body and a base support pivotally mounted on the extending up from the body, the unit comprising: an elongated, tubular mounting base; means on the mounting base for detachably connecting the same to the base support of the motor vehicle; a rigid, elongated tubular boom passing entirely through the mounting base, the boom having a front end and a back end, both provided with at least one upright support; means for slidably guiding the boom through the mounting base; motor means on the mounting base for moving the boom through the latter in either direction; at least one vertical, supporting post mounted on the mounting base, the supporting post carrying at its top end at least one roller; at least one tension cable extending between the top ends of the upright supports at both ends of the boom for strengthening the latter; the cable being supported and riding over the roller at the top end of the supporting post; means fixed on the front end of the boom for gripping and de-branching a felled tree; other means on the front end of the boom for cutting the top of the tree; and means fixed on the mounting base for gripping the tree adjacent its butt end, whereby the felled tree is picked up adjacent its butt end by tilting the base support, moving the boom through the mounting base toward the tree, and, maneuvering the gripping means fixed on the front end of the boom; the tree then being clamped adjacent its butt end by the gripping means fixed on the mounting base after having rearwardly moved the boom; and lastly, the tree being de-branched and its top end cut by again moving the boom forward.

The mounting means includes at least two hangers slidably mounted on the tension cable and hydraulic lines suspended from the hangers, the hydraulic lines extending between the back end of the boom and the vicinity of the base.

The means for moving the boom through the base member comprises a pair of parallel drive chains mounted on top of the boom and extending over its length, a pair of drive sprockets mounted in the base above the boom over which the chains are guided, and motor means for operating the sprockets to drive the boom in either direction.

The unit includes means for guiding the boom through the base member, the guiding means including: a set of guide rollers at each end of the base bearings on the bottom of the boom, a set of guide rollers at each end of the base bearing on the top of the boom, a guide roller at each end of the base bearing on one side of the boom, and a guide roller at each end of the base bearing on the other side of the boom.

The base member has upper and lower sides and a pair of lateral sides. The means on the base member for gripping a tree adjacent the butt end of the tree includes a backing member extending down from the lower side of the base member at one lateral side thereof, a jaw member extending down from the lower side of the base member at the other lateral side thereof, and hydraulic means on the base member for moving the jaw member toward the backing member to grip a tree trunk therebetween, the hydraulic means being fed by the external hydraulic lines.

The gripping and de-branching means on the boom includes a pair of movable jaw members extending down from the front end of the boom, the jaw members opposing each other, being longitudinally offset from each other, and being hydraulically operated by the hydraulic lines.

A preferred embodiment of the processing unit according to the invention will now be described in detail having reference to the accompanying drawings in which:

FIGS. 8a to 8d are elevation views of the mounted processing unit showing its sequence of operation.

Figure 1:
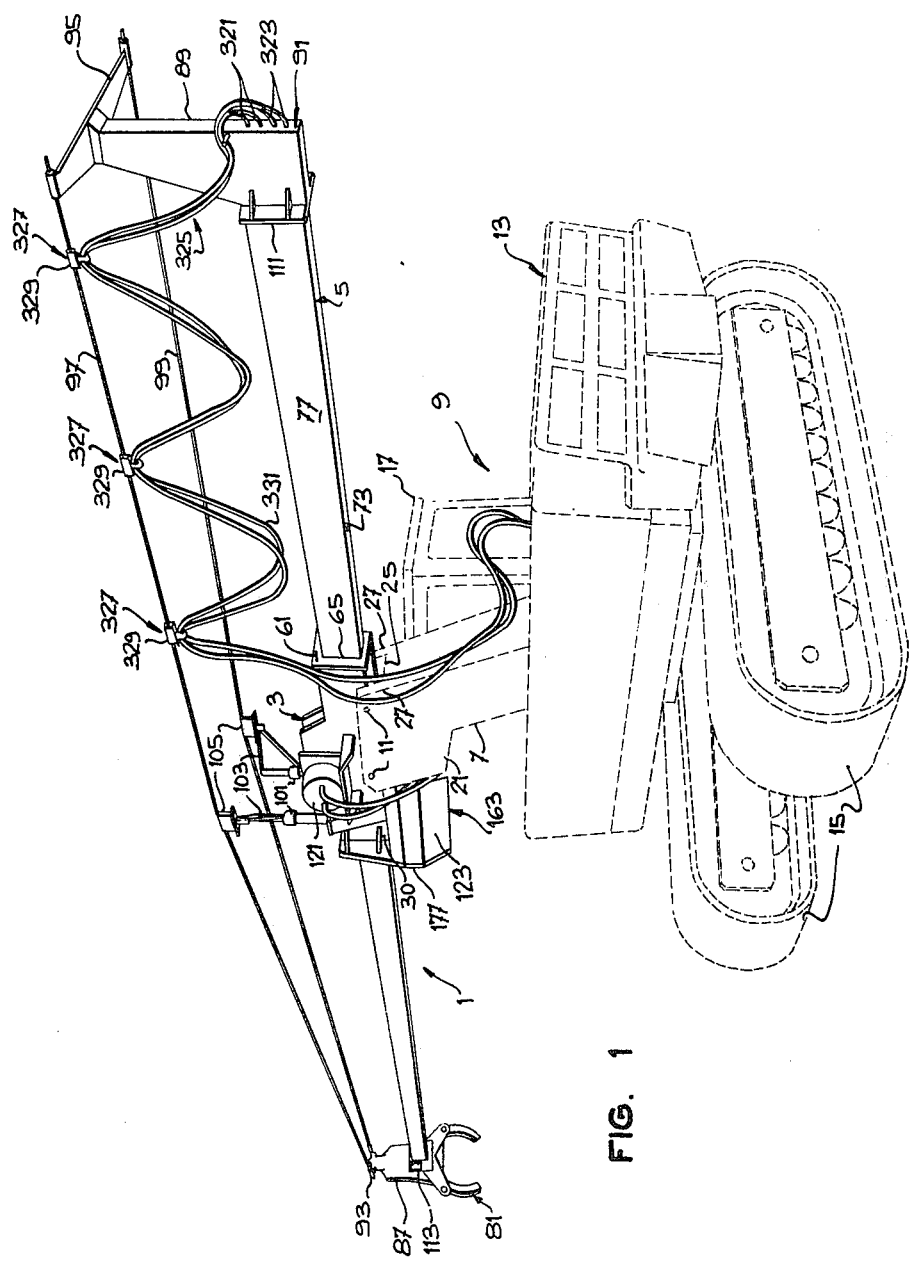
FIG. 1 is a perspective view of the tree processing unit mounted on a modified hydraulic shovel.
Figure 3:
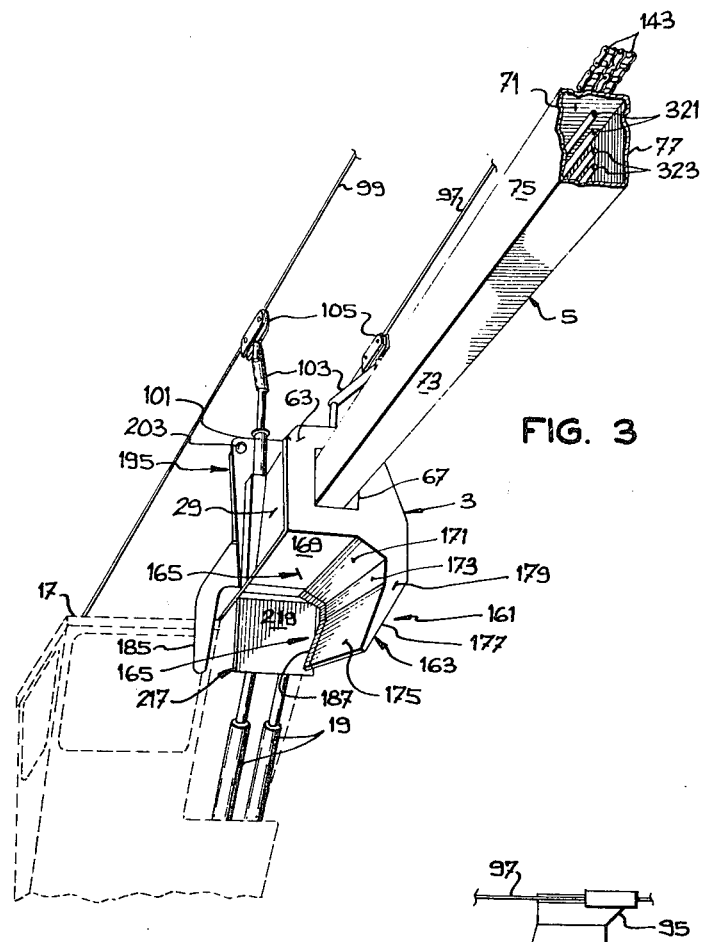
FIG. 3 is another partial perspective view of the unit.

The tree processing unit 1 shown in FIG. 1 has a mounting base 3 and a boom 5 extending through the base. The base 3 is detachably connected by means of bolts 11 to a base support 7 which is part of a conventional hydraulically operated excavator 9. The excavator 9 is of the type having a main body 13 rotatably mounted on a pair of tracks 15. An operator's cab 17 is mounted on the body 13 and the base support 7 is pivotably mounted on, and extends up from the main body 13 adjacent the cab 17. Hydraulic means 19, as shown in FIG. 3, extend between the body 13 and the upper portion 21 of base support 7 so that the base support 7 can be pivoted about its mounting on the body 13.

Figure 2:
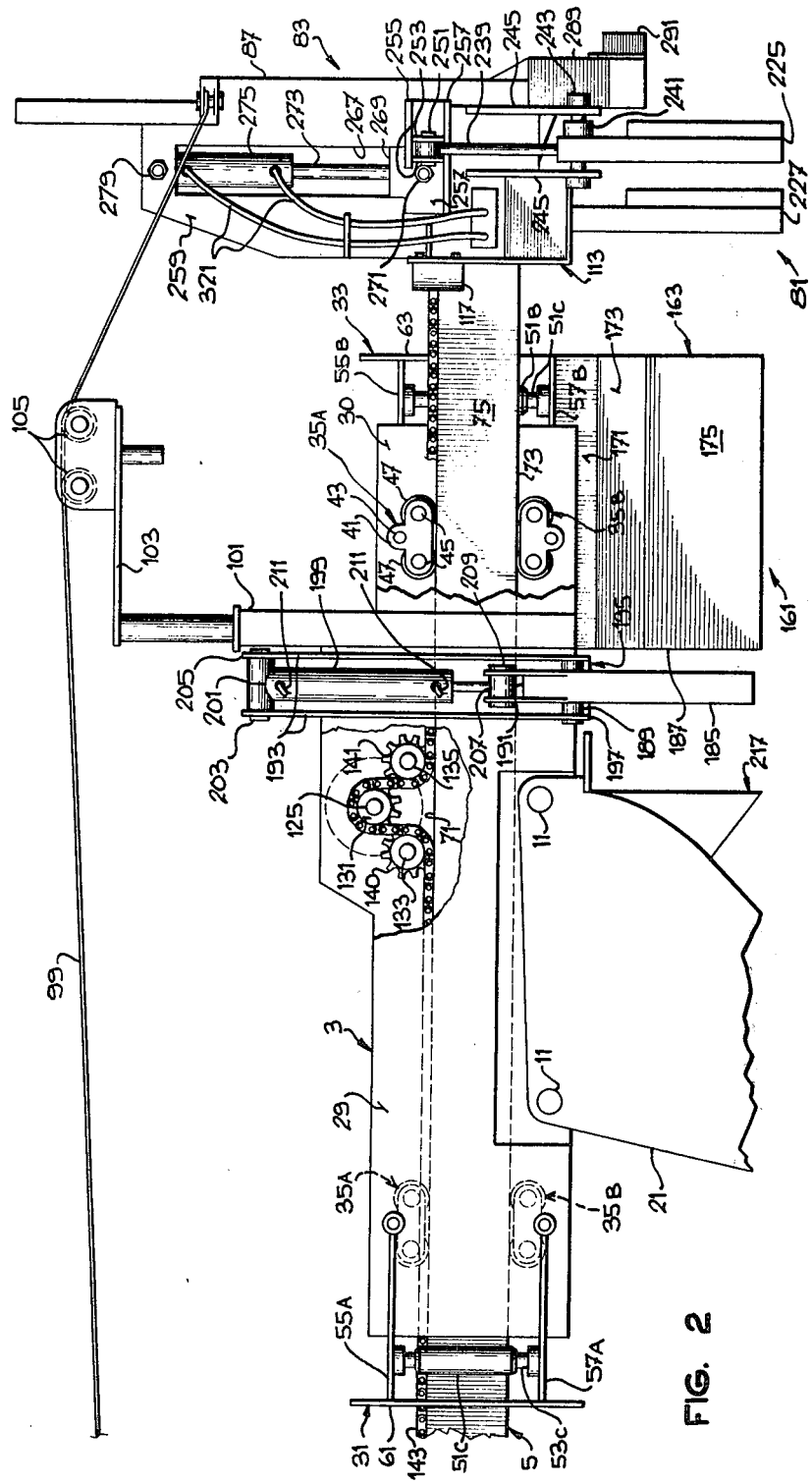
FIG. 2 is a detail side view, in partial cross-section, of the unit.

As shown in FIG. 2, the upper portion 21 of the base support 7 has a channel 25 on its upper side in which the base 3 of the processing unit 1 is partly seated after the boom and shovel (not shown) of the excavator has been removed. The mounting bolts 11 pass through the side walls 27 of the base support defining the channel 25 and through the side walls 29 and 30 of the base 3.

Figure 5:
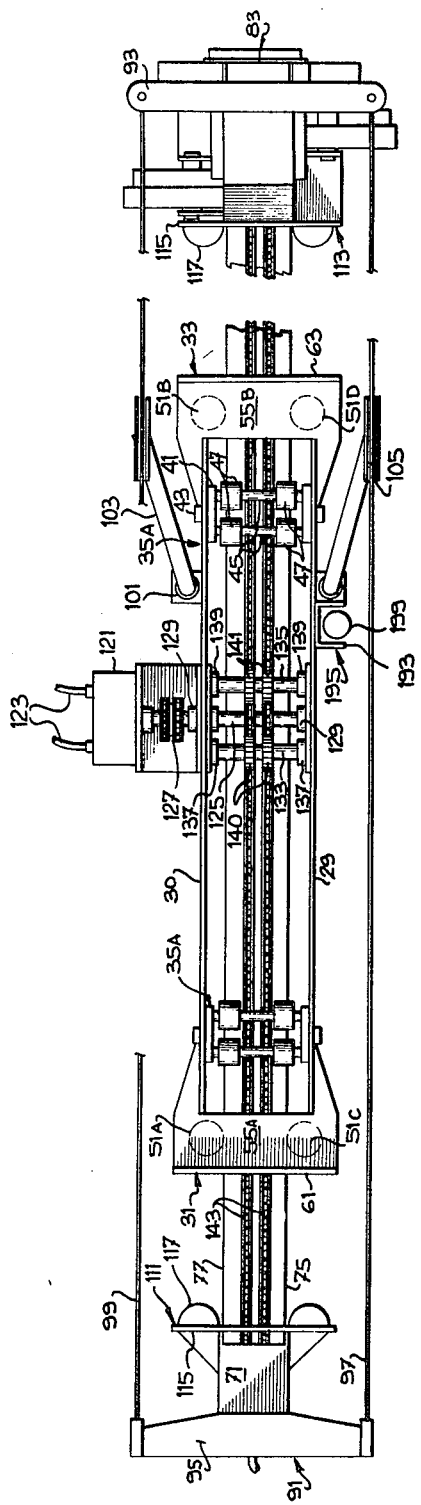
FIG. 5 is a detail top view of the unit.

Referring to FIG. 2, the base 3 is elongated and its both ends 31 and 33 project past the upper portion 21 of the base support 7 when mounted thereon. The base 3 has means for guilding the boom 5 longitudinally through it. These guiding means include top and bottom guides comprising four sets 35 of guide rollers, two sets near each end 31 and 33 of the base 3, one set 35A at each end above the boom, an other set 35B at each end below the boom and beneath the support set. Each roller set 35 is identical and, as shown in FIGS. 2 and 5, includes a pair of end plates 41. Each end plate 41 is mounted adjacent the inner surface of a side wall 29 or 30 of the base 3 by a bolt 43. A pair of parallel axles 45 extend between the end plates 41. Each axle 45 carries two rollers 47, one roller adjacent each end plate 41. The rollers 47 are rotatably mounted on the axles 45. The rollers 47 of the upper guide sets 35A bear un the top of the boom and the rollers 47 of the bottom guide sets 35B bear on the bottom of the boom.

The guide means also include side guides adjacent each end 31 and 33 of the base 3. The side guides comprise a first pair of spaced apart rollers 51A and 51B bearing on one side of the boom and a second pair of spaced apart rollers 51C and 51D bearing on the other side of the boom as shown in FIG. 5. Each roller 51 is rotatably mounted on a vertically extending axle 53. The axles 53A and 53C are each mounted between an upper brace plate 55A and a parallel, lower brace plate 57A at one end 31 of the base 3. The axles 53B and 53D are also each mounted between an upper brace plate 55B and a lower, parallel brace plate 57B at the other end 33 of the base 3.

The brace plates 55A and 57A, at one end 31 of the base 3, also support an end plate 61 spaced from the ends of the sidewalls 29 and 30. The brace plates 55B and 57B at the other end 33 of the base 3, also support an end plate 63 spaced from the other ends of sidewalls 29 and 30. The end plates 61 and 63 have central, generally rectangular holes 65 and 67 respectively through which the boom 5 passes.

The boom 5, as shown in FIG. 3, comprises a rigid, elongated tubular member having a top wall 71, a bottom wall 73 and sidewalls 75 and 77. These walls define a boom having a rectangular cross-section. The boom 5 is mounted through the base 3 which its bottom wall 73 bearing on the bottom roller guide sets 35B, its top wall 71 bearing against the upper roller guide sets 35A, its one side wall 75 bearing against rollers 51C, and 51D and its other side wall 77 bearing against rollers 51A and 51B.

The boom 5 carries at its front end 83, means 81 for gripping and debranching a tree, a means 85 for cutting the tree, as will be described. The boom 5 also carries a first, relatively short, upright support 87 as shown in FIG. 1 at the front end 83 and a second, relatively short upright support 89 at the back end 91. The first support 87 has a cross brace 93 at its top end. The second support 89 also has a cross brace 95 at its top end. A pair of tension cables 97 and 99 extend between the ends of the cross braces 93 and 95, thus strengthening the boom 5. Means (not shown) can be provided at one end of the cables for properly tensioning them. A pair of cable supporting posts 101 are mounted on the sidewalls 29 of the base 3. The posts 101 each extend upwardly and carry at their top ends rotatable arms 103. These rotatable arms 103 extend horizontally from the posts 101 and carry inturn at their free ends a pair of rollers 105 over which the cables 97 and 99 can ride. This arrangement eases the movement of the support cables 97 and 99 above the base 3 when the boom 5 moves forwards or backwards.

The boom 5 also carries a first stop plate 111 near the back end 91 just in front of the cable support 89 and a second stop plate 113 near the front end 83 of the boom just in front of the gripping means 81. The stop plates 111 and 113 each extend transverse to the boom and have side portions 115 extending laterally from the boom as shown in FIG. 5. A pair of resilient bumpers 117 are mounted on the surface of the side portions 115 of each plate which faces the base 3. The bumpers 117 cooperate with the end plates 61 and 63 on the base 3 to cushion stopping of the boom 5 as it reaches its end of travel relative to the base 3.

Figure 4:
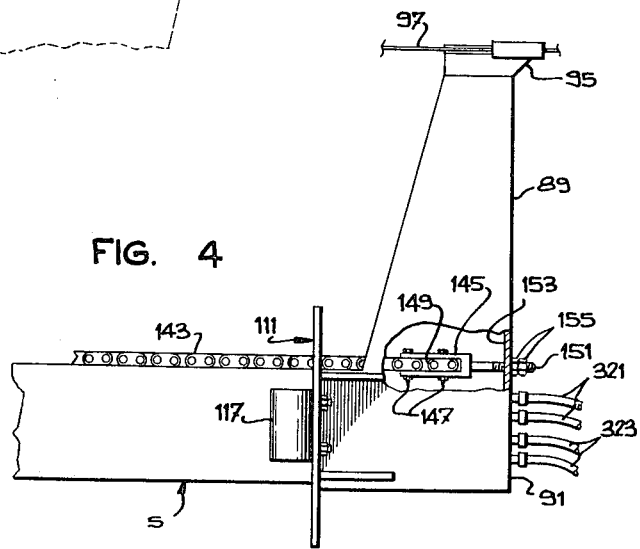
FIG. 4 is a detail view, in partial section, of the rear end of the boom.

Means are provided for moving the boom 5 through the base 3 in either direction. These moving means include a motor 121 mounted on the base 3 as shown in FIGS. 1, 2 and 5. The motor 121 preferably is a hydraulic motor and is mounted on one sidewall 30 of the base 3. The motor 121 is operated through hydraulic lines 123 leading to the motor from the body 13 of the tractor. The motor 121 rotates a shaft 125 through a clutch 127. The shaft 125 is mounted in bearings 129 on the sidewalls 29 and 30 is located above the top wall 71 of the boom 5. The shaft 125 carries a pair of sprockets 131. Two additional guide shafts 133 and 135 are rotatably mounted in bearings 137 and 139 respectively in the base sidewalls 29 and 30, the the shafts 133 and 135 being parallel to the drive shaft 125. The shaft 133 is on one side of the drive shaft 125 and the shaft 135 on the other side, close to shaft 125, both shafts 133 and 135 being slightly below the drive shaft 125. The shaft 133 carries a pair of sprockets 140. The shaft 135 also carries a pair of sprockets 141. A pair of parallel drive chains 143 are mounted on the top wall 71 of the boom 5 extending at least between the stop plates 111 and 113. Each end of each chain 143 is fixed to the boom. At one end 91, the chains are fixed to the boom with a bracket 145, as shown in FIG. 4, that is connected at its one end by bolts 147 to the end 149 of the chain and at its other end by a threaded shank 151 passed through the back wall 153 of the upright support 89. A pair of nuts 155 screw onto the shank 151 to fix the end of the chain. The nuts 155 and threaded shank 151 permit the tension of the chains to be adjusted.

Each chain 143 passes under one guide sprocket 140, up and over a drive sprocket 131, and back under the other guide sprocket 141. When the motor 121 is driven in one direction, the drive sprockets 131 drive the boom via chains the 143 in one direction, through the base 3, supported by the guide rollers 47 and guide rollers 51. When the motor 121 is driven in the other direction, so is the boom. The double chain and drive sprocket arrangement provides a smooth drive to the boom and minimizes breakdown of the drive.

The base 3 carries means 161 for gripping a tree adjacent its butt end. As shown in FIG. 3 the gripping means 161 includes a backing member 163 extending down from one side 30 of the base 3 by its front end. The backing member 163 is fixed to both side walls 29 and 30 of the base 3 and provides an inner, downwardly opening pocket 165 against which a tree trunk can be held. The pocket 165 is formed by a front plate 167 bent to provide a series of planar surfaces. The planer surfaces comprise a first horizontal top surface 169 extending inwardly from sidewall 29 of the base, a second, narrow angled surface 171 extending down and away from the first surface, a third narrow vertical surface 173 and a fourth wide surface 175 extending down and in at a slight angle from the third surface. The surfaces 169, 171, 173 and 175 can also be provided by individual plate members joined by welding to provide the pocket. A backing plate 177 extends up from the bottom edge of the surface 175 to the sidewll 30 of the base 3. End plates 179 can join the front and back plates 167 and 177 together. Instead of angular surfaces, the pocket could be formed by a curved surface. Instead of using plates to form the backing member 163, it could also be cast with angular or curved pocket surfaces.

The gripping means 161 also includes a jaw member 185 which is mounted on the sidewall 29 of the base 3 and which extends down below the base 3 to be just offset longitudinally from the inner end 187 of the backing member 163 and opposite to it. The jaw member 185, as shown in FIG. 2, is pivotably mounted on a horizontal pin 189 near its upper end 191. The pin 189 is mounted between the sidewalls 193 of the vertically positioned U-shaped channel member 195 adjacent its bottom end 197. The channel member 195 is fixed to the sidewall 29 of the base 3. A hydraulic cylinder 199 is pivotably mounted at its top cylinder end 201 by a pin 203 to the sidewalls 193 of member 195 adjacent its top end 205. The piston rod end 207 of the cylinder 199 is pivotably mounted by a pin 209 to the upper end 191 of the jaw 185. The actuation of cylinder 199, through hydraulic lines 211 leading up from body 13, pivots jaw 185 about pin 189 toward the backing member 163 to security grip a log between the jaw and backing member.

Abutment means 217 are provided on the base 3 for receiving the butt end of the tree to be processed to locate the same. The abutment means 217 comprises an abutment plate 219 located on the base 3 just behind the gripping jaw 185 as shown in FIG. 3. The plate 219 extends down from the bottom of the base 3 and transverse to it.

Figure 6:
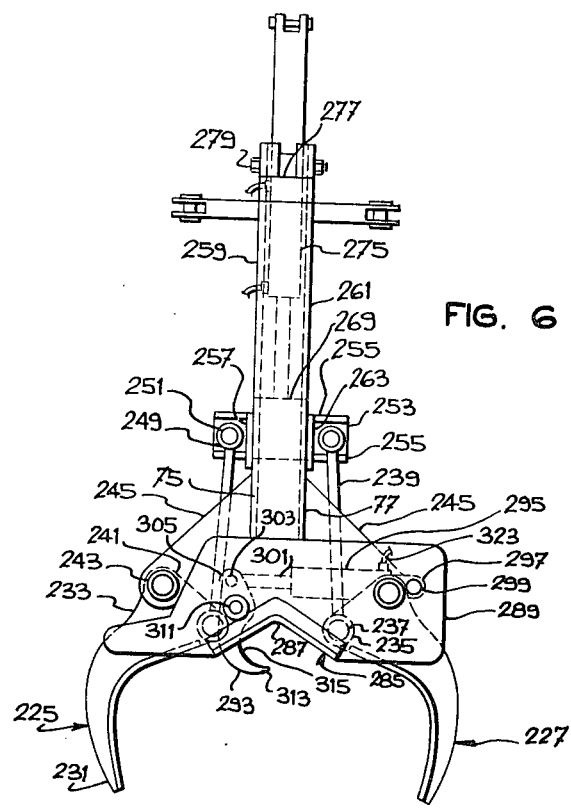
FIG. 6 is a detail elevation view of the front end of the boom.
Figure 7:
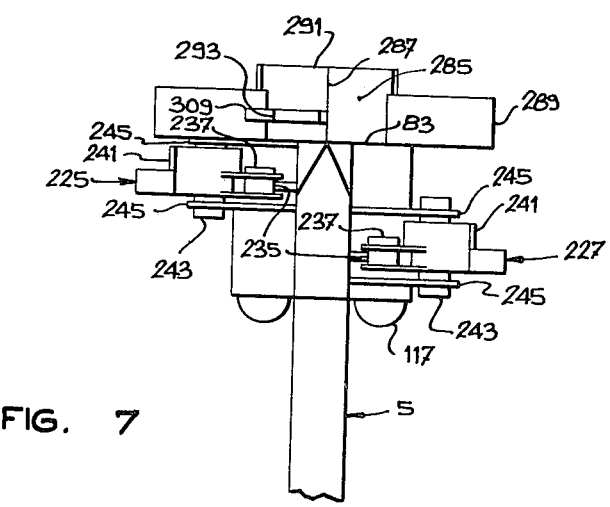
FIG. 7 is a detail bottom view of the front end of the boom.

The gripping and debranching means 81 at the one end 83 of the boom 5 has a pair of curved jaws 225 and 227 as shown in FIGS. 2, 6 and 7. The jaws curve toward each other and are longitudinally offset from each other, the jaw 225 being located in front of jaw 227. Each jaw is mounted and operated in the same manner except that one jaw is left handed and the other right handed, so that the mounting of only one jaw will be described. Jaw 225 has a generally right-angular shape with the one arm 231 used to grip a tree and the other arm 233 used to mount the jaw. The end 235 of the arm 233 is pivotably mounted by a pin 237 to an operating rod 239. The jaw has a boss 241 on its arm 233 by its free end 235. The jaw is pivotably mounted at boss 241 by a pin 243 between a pair of mounting plates 245 fixed to the one sidewall 75 of the boom at its front end. The upper end 249 of the operating rod 239 is pivotably mounted by a pin 251 to a pair of vertical mounting plates 253. The mounting plates 253 in turn are fixed between a pair of horizontal support members 255 which are fixed to a side guide plate 257. The guide plate 257 lies adjacent a first, vertical support wall 259. The support wall 259 extends up from the one side wall 75 of the boom and is connected at its front edge to the front vertical support 87.

A second, vertical support wall 261 is mounted on, and extends up from the other sidewall 77 of the boom. This second support wall 261 is parallel to the first wall 259 and is also fixed at its front edge to support 87. A second guide plate 263 lies adjacent the outside of the second wall 261. This guide plate 263 is connected to the second jaw 227 by set of means identical to that which connects the first jaw 225 to the first of means identical to that which connects the first jaw 225 to the first guide plate 257. Each support wall 259 and 261 has a vertical guide slot 267 extending up from the boom. A guide block 269 rides in the two slots 267, extending between the walls 259 and 261. The guide plates 257 and 263 are fixed to the guide block 269 by a bolt 271. The guide block 269 is fixed to the free end of a piston rod 273 extending from a vertical hydraulic cylinder 275 mounted between the walls 259 and 261. The cylinder 275 is pivotably mounted at its upper end 277 to the walls 259 and 261 by a pivot pin 279.

The operation of the cylinder 275 in one direction, to raise the block 269, causes the rods 239 to pivot the jaws 225 and 227 about their pivots 243 to close the jaws in overlapping relation. The operation of the cylinder 275 in the other direction, to lower block 269, causes the jaws to open to the position shown in FIG. 6.

The gripping and debranching means 81 also include an anvil surface 285 near jaw 225. The surface 285 has a shallow, inverted V-shape. The peak 287 of this V-surface is located in the center of the boom and is centrally mounted in the bottom of a housing 289 which is mounted on the front end of the boom beneath the vertical support 87.

The anvil surface 285 has a forwardly projecting angled edge 291 which cooperates with the inner edges of the gripping jaws 225 and 227 when they are closed about a tree, to encircle the tree and to debranch it when all the three edges are moved along the tree.

The front end 83 of the boom 5 also carries cutting means 85 for cutting the tops of the trees. The cutting means 85 comprise a cutting element 293 movably mounted within the housing 289. The element 293 cooperates with the anvil surface 285 to cut the top of a tree therebetween. In more detail a hydraulic cylinder 295 is mounted horizontally within the housing 289 as shown in FIG. 6. One end 297 of the cylinder 295 is pivotably mounted by a pivot pin 299 to the walls of the housing. The free end of the piston rod 301 of the cylinder 295 is pivotably connected by a pivot pin 303 to one end 305 of the cutting element 293. The cutter 293 extends down from the housing through a slot 309 (see FIG. 7) formed in the anvil surface 285 on one side of the peak 287. The slot 309 can extend across the peak 287 in the anvil surface 285 if needed. The cutting element 293 is pivotably mounted by a pivot pin 311, adjacent its one end 305 to the walls of the housing 289. The projecting end 313 of the cutter 293 has a cutting edge 315 facing anvil surface 285. When the cylinder 295 is actuated, the cutter 293 is pivoted about pin 311 out of housing 289 to move toward the anvil surface 285 to cut the top of a tree against it.

The pairs of hydraulic lines 321 and 323 used to operate the hydraulic cylinders 285 and 295 respectively are mounted within the hollow boom 5 and extend the length thereof. The lines 321 emerge from the boom from its sidewall 75 adjacent its front end 83 to connect to the ends of the cylinder 275. Similarly, the lines 323 emerge from the front of the boom to connect to the ends of cylinder 295 within housing 289. The lines 321 and 323 emerge from the back end wall 91 of the boom 5, away from its processing end, and are joined in a bundle 325 of flexible lines. The bundle 325 is supported at generally equally spaced locations 327 along its length by hanger members 329 slidably mounted on one of the tension cables 97 between the middle cable support 101 and the rear cable support 89. Near the base 3, the line bundle 325 travels down to the hydraulic equipment carried by the body 13 of the excavator. The line bundle 325 hangs in loops 331 from the hangers 329 when the boom 5 is forwardly located in the base 3, the loops providing take-up length when the boom 5 is moved rearwardly of the base. In this manner the hydraulic lines are located away from the processing operations and protected by the boom.

In operation, as shown in FIGS. 8a to 8d, with the unit 1 mounted on an excavator having its shovel removed, boom 5 is first moved forwardly in base 3 to an extended position. The boom 5 is aligned with a felled tree which is to be processed by manoeuvering the excavator and/or turning the excavator body 13 on the tracks 15. The boom 5 is then tilted down to pick up the tree adjacent its butt end by tilting the base support 7 down by operation of the hydraulic cylinders 19. The hydraulic cylinder 285 is actuated to close the jaws 225, 227 about the tree trunk to grip it tightly.

The motor 121 is then actuated to move the boom, via the sprockets 131 and chains 143, rearwardly in the base, guided by rollers 47 and 51.

The boom 5 is moved rearwardly until the butt end "B" of the tree "T" contacts the abutment plate 219 on the base 3. The motor 121 then is stopped and the cylinder 199 is actuated to move the clamping jaw 185 toward the backing member 163 on the base 3 to securely clamp the tree adjacent its butt end against the backing member 163. The mechanism 1 can now be levelled by operation of cylinders 19 moving the base support 7 if desired.

With the butt portion of the tree now firmly gripped between the jaw 185 and the backing member 163, the jaws 225 and 227, which originally tightly gripped the tree, can now be moved slightly away from the tree trunk via cylinder 275 to slightly loosen their grip on the tree. The jaws however still encircle the major bottom portion of the tree, the jaws overlapping each other, and holding the minor top portion of the tree adjacent the front cutting edge 291 of the anvil surface 285. The boom 5 is now moved forwardly in the base along the length of the stationary tree via motor 121 to debranch the tree using the inner edges of the jaws 225, 227 and the anvil edge 291. When the boom 5 reaches the top of the tree, its movement is stopped by stopping the motor 121 and the cylinder 295 is actuated to operate the cutter 293 which cuts the top of the tree off. The excavator and/or boom can now be operated to deposit the processed tree where desired.

It will be seen that the processing unit 1 is compact and substantially self-contained. It is easily mounted on an existing hydraulic excavator equipment by merely removing the main boom and bucket of the shovel of the excavator and mounting the processing unit on the support 7. The hydraulic lines for the cylinders 285 and 295, cylinder 199, and motor 121 can be easily connected to the existing hydraulic system of the excavator.

The embodiments of the invention in which an exclusive property or privilege is claimed are defined as follows:

1. A tree processing unit comprising a base member, a boom with a front end and a back end extending through the base member, means for moving the boom through the base member, means on the base member for gripping a tree adjacent its butt end, means fixed on the front end of the boom for gripping and debranching a tree, means fixed on the front end of the boom for cutting the top of the tree, means on the base member for detachably connecting the unit to a base support on a motor vehicle which contains hydraulic power means, an upright support at each end of the boom, at least one tension cable extending between the supports above the boom to strengthen the same, at least two hangers slidably mounted on the tension cable, and hydraulic lines suspended from the hangers, the hydraulic lines extending between the back end of the boom and the vicinity of the base.

2. A unit as claimed in claim 1 wherein the hydraulic lines extend through the boom from the other end to the one end to operate the gripping and debranching means and the cutting means.

3. A tree processing unit comprising a base member; a boom with a front end and a back end extending through the base member; means for moving the boom through the base member; means on the base member for gripping a tree adjacent its butt end; means fixed on the front end of the boom for gripping and debranching a tree; means fixed on the front end of the boom for cutting the top of the tree; means on the base member for detachably connecting the unit to a base support on a motor vehicle which contains hydraulic power means; an upright support at each end of the boom; and at least one tension cable extending between the supports above the boom to strengthen the same; the means to move the boom through the base member including: a pair of parallel drive chains mounted on top of the boom and extending over its length, a pair of drive sprockets mounted in the base above the boom over which the chains are guided, and motor means for operating the sprockets to drive the boom in either direction.

4. A tree processing unit comprising a base member; a boom with a front end and a back end extending through the base member; means for moving the boom through the base member; means on the base member for gripping a tree adjacent its butt end; means fixed on the front end of the boom for gripping and debranching a tree; means fixed on the front end of the boom for cutting the top of the tree; means on the base member for detachably connecting the unit to a base support on a motor vehicle which contains hydraulic power means; an upright support at each end of the boom; at least one tension cable extending between the supports above the boom to strengthen the same; and means for guiding the boom through the base member, said guiding means including: a set of guide rollers at each end of the base bearing on the bottom of the boom, a set of guide rollers at each end of the base bearing on the top of the boom, a guide roller at each end of the base bearing on one side of the boom, and a guide roller at each end of the base bearing on the other side of the boom.

5. A tree processing unit comprising a base member; a boom with a front end and a back end extending through the base member; means for moving the boom through the base member; means on the base member for gripping a tree adjacent its butt end; means fixed on the front end of the boom for gripping and debranching a tree; means fixed on the front end of the boom for cutting the top of the tree; the base member having upper and lower sides and a pair of lateral sides extending between the upper and lower sides; means on the base member adjacent the lower side thereof for detachably connecting the unit to a base support on a motor vehicle which contains hydraulic power means; an upright support at each end of the boom; and at least one tension cable extending between the supports above the boom to strengthen the same; the gripping means on the base member including: a backing member extending down from the lower side of the base member at one lateral side thereof, a jaw member extending down form the lower side of the base member at the other lateral side thereof, and hydraulic means on the base member for moving the jaw member toward the backing member to grip a tree trunk therebetween, said hydraulic means being fed by said hydraulic lines.

6. A unit as claimed in claim 5 wherein the backing member is formed with a pocket, facing the jaw member, to receive the tree trunk.

7. A tree processing unit comprising a base member, a boom with a front end and a back end extending through the base member, means for moving the boom through the base member, means on the base member for gripping a tree adjacent its butt end, means fixed on the front end of the boom for gripping and debranching a tree, means fixed on the front end of the boom for cutting the top of the tree, an upright support at each end of the boom, and at least one tension cable extending between the supports above the boom to strengthen the same; the gripping and debranching means including a pair of movable jaw members extending down from the front end of the boom, said jaw members opposing each other, being longitudinally offset from each other, and being hydraulically operated by said hydraulic lines.

8. A unit as claimed in claim 7 including an anvil surface facing downwardly, the anvil surface cooperating with the movable jaws, when moved toward each other, to grip a tree therebetween.

9. A unit as claimed in claim 8 including a leading edge on the anvil surface for cooperating with the jaws to debranch the tree.

10. A unit as claimed in claim 8 wherein the cutting means comprise a cutting member adjacent the anvil surface and hydraulic means fed by the hydraulic lines for moving the cutting member toward the anvil surface to cut a tree therebetween.

11. A unit as claimed in claim 7 including means for connecting the jaw members to a common block mounted for vertical sliding movement, and hydraulic means fed by the hydraulic lines for moving the block up or down to move the jaws toward or away from each other.

12. A tree processing unit to be used in combination with a conventional motor vehicle which includes hydraulically operated power means, the motor vehicle including a main body and a base support pivotably mounted on and extending up from said body, said unit comprising:

an elongated, tubular mounting base;
means on the mounting base for detachably connecting the same to the base support of the motor vehicle;
a rigid, elongated tubular boom passing entirely through the mounting base, said boom having a front end and a back end both provided with at least one upright support;
means for slidably guiding the boom through the mounting base;
motor means on the mounting base for moving the boom through the latter in either direction;
at least one vertical, supporting post mounted on the mounting base, said supporting post carrying at its top end at least one roller;
at least one tension cable extending between the top ends of the upright supports at both ends of the boom for strengthening the latter, said cable being supported and riding over the roller at the top end of the supporting post;
means fixed on the front end of the boom for gripping and debranching a felled tree;
other means fixed on the front end of the boom for cutting the top of the tree; and
means fixed on the mounting base for gripping the tree adjacent its butt end, whereby the felled tree is picked up adjacent its butt end by tilting the base support, moving the boom through the mounting base towards the tree and maneuvering the gripping means fixed on the front end of the boom; the tree is then clamped adjacent its butt end by the gripping means fixed on the mounting base after having rearwardly moved the boom, and lastly, the tree is debranched and its top end is cut by moving again the boom forwards.

13. A unit as claimed in claim 12 wherein said motor means for moving the boom through the mounting base comprises a pair of parallel drive chains mounted on the top of the boom and extending over its length, a pair of drive sprockets mounted on the mounting base above the boom and over which the chains are guided, and a motor for operating the sprockets to drive the boom in either direction.

14. A unit as claimed in claim 13, wherein said means for slidably guiding the boom through the mounting base comprises a set of guide rollers at each end of the mounting base bearing on the bottom of the boom, a set of guide rollers at each end of the mounting base bearing on the top of the boom, a guide roller at each end of the mounting base bearing on one side of the boom, and a guide roller at each end of the mounting base bearing on the other side of the boom.

15. A unit as claimed in claim 14, wherein the gripping and debranching means fixed on the front end of the boom, includes a pair of movable, opposite jaw members extending down from the front end of the boom, said jaw members being longitudinally offset from each other and hydraulically operated by hydraulic lines extending from the motor vehicle near the vicinity of the mounting base, to the front end of the boom.

16. A unit as claimed in claim 15, wherein the gripping and debranching means fixed on the front end of the boom includes an anvil surface facing downwardly, the anvil surface cooperating with the movable jaws, when moved toward each other, to grip a tree therebetween.

17. A unit as claimed in claim 16, wherein the anvil surface has a leading edge for cooperating with the jaw members to debranch the tree.

18. A unit as claimed in claim 16, wherein the cutting means comprise a cutting member adjacent the anvil surface and hydraulic means fed by the hydraulic lines extending from the motorized equipment for moving the cutting member toward the anvil surface to cut the top of the tree therebetween.

19. A unit as claimed in claim 15, 16, 17, including means for connecting the jaw members to a common block mounted for vertical sliding movement, and hydraulic means fed by the hydraulic lines extending from the motor vehicle, for moving the block up or down to move the jaws toward or away from each other.

20. A unit as claimed in claim 18, wherein the hydraulic lines connected to the gripping and debranching means and to the cutting means fixed on the front end of the boom, extend externally from the motor vehicle, near the vicinity of the mounting base, to the back end of the boom and internally through the boom, from the back end to the front end of the same, said hydraulic lines extending externally between the motor vehicle and the back end of the boom being suspended from at least one hanger slidably mounted on the tension cable.

21. A unit as claimed in claim 12, 13 or 14, wherein the base member has a pair of upper and lower sides and a pair of lateral sides extending between the upper and lower sides and wherein the gripping means located on the mounting base comprises a backing member extending down from the lower side of the mounting base at one lateral side thereof, said backing member providing an inner, downwardly opening pocket to receive the trunk of the tree to be processed, a jaw member extending down from the lower side of the mounting base at one lateral side thereof and hydraulic means on the mounting base to grip a tree trunk therebetween, said hydraulic means being fed by hydraulic lines from the motor vehicle.

22. A unit as claimed in claim 12, 13 or 4, including abutment means located on the mounting base adjacent the gripping means located on said mounting base, for receiving the butt end of the tree to be processed.

* * * * *